United States Patent [19]

Fischer

[11] 3,935,006

[45] Jan. 27, 1976

[54] PROCESS FOR ELUTING ADSORBED GOLD AND/OR SILVER VALUES FROM ACTIVATED CARBON

[75] Inventor: Dennis D. Fischer, Laramie, Wyo.

[73] Assignee: The United States of America as represented by the Secretary of the Interior, Washington, D.C.

[22] Filed: Mar. 19, 1975

[21] Appl. No.: 559,941

[52] U.S. Cl. ............... 75/118 R; 75/101 BE; 423/24
[51] Int. Cl.² .......................................... C22B 11/00
[58] Field of Search........ 75/118 R, 101 BE; 423/24

[56] References Cited
UNITED STATES PATENTS

| | | | |
|---|---|---|---|
| 2,476,420 | 7/1949 | Krebs | 75/106 |
| 2,478,652 | 8/1949 | Byler et al. | 75/103 |
| 2,545,239 | 3/1951 | McQuiston et al. | 75/118 X |
| 2,658,827 | 11/1953 | Rizo-Patron | 75/2 |
| 2,810,638 | 10/1957 | Hazen | 75/107 |
| 3,736,126 | 5/1973 | Fritz et al. | 75/118 R |
| 3,834,896 | 9/1974 | Eisele et al. | 75/118 R |

*Primary Examiner*—G. Ozaki
*Attorney, Agent, or Firm*—Roland H. Shubert; Donald R. Fraser

[57] ABSTRACT

A process is disclosed which is directed to recovering gold and/or silver values from activated carbon, wherein gold and/or silver has been adsorbed thereon. The process comprises eluting the activated carbon with water soluble alcohols or ketones either alone or with aqueous solutions thereof and a strong base may be added to further facilitate elution.

11 Claims, 2 Drawing Figures

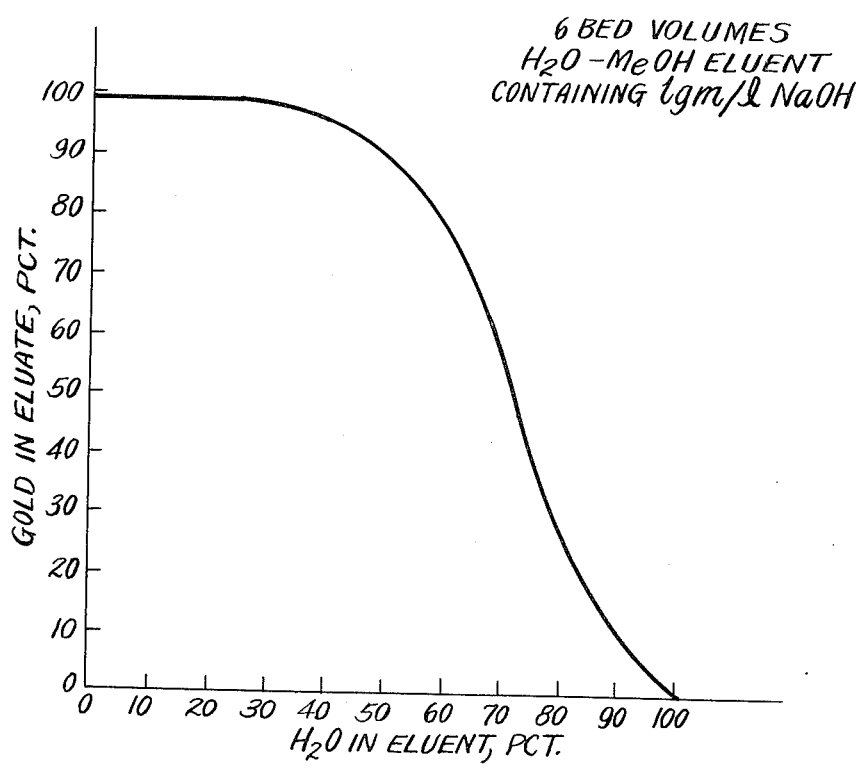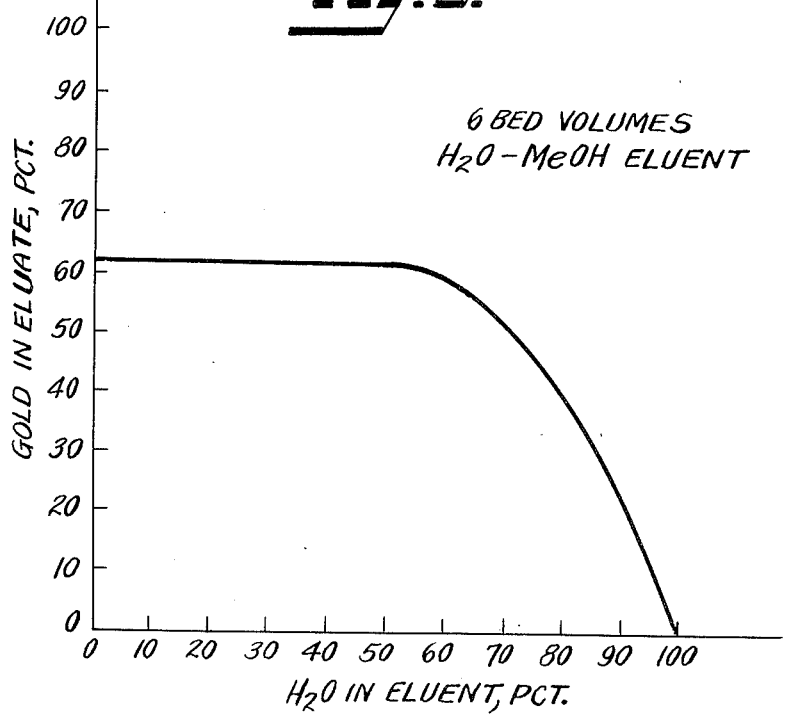

PROCESS FOR ELUTING ADSORBED GOLD AND/OR SILVER VALUES FROM ACTIVATED CARBON

BACKGROUND OF THE INVENTION

This invention relates to a relatively simple method for recovering gold and/or silver values from activated carbon which has such values absorbed thereon from processing solutions, and provides a simple method of regeneration of the activated carbon for reuse.

The recovery of gold and/or silver metals from their ores requires a multi-step process in which a solution or pulp containing the metal values is usually produced. A typical process involves the grinding of the metal bearing ores, treating the ground ores with an alkaline cyanide solution to leach the metals from the ores and thereafter recovering the gold and/or silver values from the cyanidation pulp solution. Other methods for obtaining gold and/or silver containing solutions are well known. A conventional method for the recovery of gold and/or silver values from the ore processing solution or pulp comprises the step adsorbing the metal values onto activated charcoal.

The recovery of gold and/or silver values from activated carbon containing the adsorbed metal values is well known in the prior art. One such method is that described in Zadra, J. B., *A Process For Recovery of Gold and Silver From Activated Carbon by Leaching and Electrolysis*, Bureau of Mine Reports of Investigations 4843 (1952). Activated carbon which has been mixed with cyanidation pulp is screened from the pulp, washed and passed to an electrodeposition circuit where hot caustic sodium cyanide solution or pressurized steam is utilized to desorb the gold or silver from the charcoal. This process necessitates the use of a high temperature for the activation of the stripped carbon prior to reuse in the cyanidation circuit and leads to carbon attrition. This results in a loss of activated carbon.

Another prior art method is disclosed in U.S. Pat. No. 2,478,652 wherein the charcoal desorption agent is an ammonia solution of a concentration in excess of 28%. Desorption is accomplished by contacting char containing metal values in a closed chamber under pressure with the saturated water ammonia solution.

SUMMARY OF THE INVENTION

The present invention provides a method for recovering gold and/or silver values which have been adsorbed onto activated carbon from a processing solution. The method is relatively simple and allows for the regeneration of used activated carbon without significant loss of carbon or efficiency in adsorbtivity upon recycle. Regeneration of the used activated carbon is accomplished by washing the activated carbon with water.

Briefly, the invention comprises contacting metal loaded activated carbon with an eluent selected from the group of a water soluble alcohol, an alcohol-water mixture, an alcohol solution of a strong base, an alcohol-water-base mixture, a water soluble ketone, and ketone-water mixture. The gold and/or silver values are readily desorbed into the eluent solution and the used activated carbon may be prepared for reuse by simply washing it with water. The activated carbon during the process may be maintained in the form of a bed or column, but the invention is in no way to be limited thereto.

DESCRIPTION OF THE DRAWINGS

The invention is further illustrated by reference to the accompanying drawings in which:

FIG. 1 is a graph illustrating the effect of water concentration in an aqueous methanolic eluent solution, containing sodium hydroxide, with respect to the percentage of gold eluted.

FIG. 2 is a graph similar to FIG. 1 wherein an aqueous methanolic eluent was used without sodium hydroxide.

DETAILED DESCRIPTION OF THE INVENTION

A preferred overall embodiment of the invention comprises contacting a bed of activated carbon, e.q., an activated carbon which has been used to adsorb gold and/or silver values from a cyanidation pulp, with an eluent comprising from about 0 to 60%, by volume, of water, about 40 to 100%, by volume, of a water soluble alcohol or ketone and at least about 0.1 gram/liter of a caustic or other strong base. However, it will be understood that greater amounts of water may be used and that the strong base may be omitted with corresponding sacrifice in extraction efficiency. After the gold and/or silver is eluted from the activated carbon, it is regenerated by washing with water.

Representative examples of strong bases which may be used in the process are the alkali metal hydroxides, for example, sodium and potassium hydroxide. The effective amount of the selected base for improved elution efficiency can readily be determined by simple experimentation.

Representative examples of water soluble alcohols and ketones are the lower aliphatic alcohols and ketones such as methanol, ethanol and acetone. Methanol is quite suitable because it is relatively inexpensive and since it does not form an azeotrope with water, may be recovered for reuse by distillation. For the purposes of this invention, there should be no distinction between activated charcoal and activated carbon.

It has been determined with the increase of the ratio of water to water soluble alcohol or ketone in the eluent, the efficiency of elution decreases. This is represented by FIG. 1, which is a graph of a series of elutions of gold wherein the percentage of water to methanol were varied. For each elution, metal-loaded activated coconut carbon column was prepared by adsorbing gold from one liter of cyanidation pulp solution, at a pH of about between 11 and 12, containing enough gold to load the columns to approximately 400 ounces of gold per ton of activated carbon. Six bed volumes of eluent were used. The results indicate that elution is above 80% when the percentage of water in the eluent is below 60% by volume and is optimized at approximately 98% when the eluent contains from about 0 to 25% by volume of water. At higher water concentrations, the efficiency of elution is sharply decreased.

Utilizing an eluent without a caustic or other strong base leads to a sharp decrease in the optimal efficiency of elution. This is illustrated by FIG. 2 which is a graph representing a series of elutions wherein the percentage of water to methanol were varied in the absence of sodium hydroxide. The column was prepared in the same manner as for the elutions represented by FIG. 1.

The invention is further illustrated by the following examples:

EXAMPLE 1

An activated coconut carbon column was prepared by adsorbing gold from 1 liter of solution at a pH between 11 and 12, said column containg sufficient gold to load the column to approximately 400 ounces of gold per ton of activated carbon. The eluent consisted of 5% water and 95% absolute ethanol and 1 gram/liter of sodium hydroxide. Over 98% of the adsorbed gold was recovered in the eluate.

Example 2, below, illustrates the effects of a water soluble ketone, for example, acetone as an eluent in the present process.

EXAMPLE 2

The activated coconut column was prepared in the same manner as Example 1. Acetone was used as the eluent resulting in over 71% of the adsorbed gold being recovered in the eluate.

EXAMPLE 3

A column was prepared in the same manner as in Examples 1 and 2. The eluent consisted of 6 bed volumes of 10% water and 90% methanol containing 1 gram/liter of sodium hydroxide. The elution step removed more than 98% of the adsorbed gold with 80% being recovered in the first two bed volumes. The column was regenerated with water with less than 0.2% of the adsorbed gold being recovered in the regeneration wash. The foregoing procedure was repeated for 6 cycles with no change in the adsorption, elution, or regeneration characteristics of the activated coconut carbon.

The elution of silver from activated carbon with the eluents of this process exhibits and analogous characteristics to that of gold. Example 5 further illustrates this point.

EXAMPLE 5

An activated coconut carbon column was loaded to approximately 375 ounces of silver per ton of activated carbon from a solution at a pH of 11. Table 1 indicates the results of elutions with different eluents.

TABLE 1

| Eluent | Silver elution, percent |
|---|---|
| Methanol | 79 |
| Methanol with 1 gm/l NaOH | 98+ |
| 25% H$_2$O-75% methanol | 75+ |
| 25% H$_2$O-75 % methanol with 1 gm/l sodium hydroxide | 98+ |

With eluents containing sodium hydroxide, 92% of the adsorbed silver was eluted in the first two bed volumes.

It should be understood that the invention is not to be limited to the exact details of operation as herein described, and the invention is therefore to be limited only by the scope of the appended claims.

I claim:

1. A process for recovering gold and/or silver values from activiated carbon with gold and/or silver values adsorbed thereon, comprising eluting said activated carbon with an eluent selected from the group consisting of water soluble alcohols, solutions of water soluble alcohols and a strong base, aqueous solutions of water soluble alcohols, aqueous solutions of water soluble alcohols and a strong base, water soluble ketones and aqueous solutions of water soluble ketones.

2. The process as defined in claim 1, wherein said eluent containg strong base comprises at least 0.1 grams of sodium hydroxide per liter of eluent.

3. The process as defined in claim 1, wherein said eluent comprises about 0 to 60%, by volume, of water and about 40 to 100%, by volume, of a water soluble alcohol.

4. The process as defined in claim 1, wherein said eluent comprises a water soluble alcohol selected from the group consisting of methanol and ethanol.

5. The process as defined in claim 1, wherein said eluent is acetone.

6. The process as defined in claim 1, wherein said strong base is an alkali metal hydroxide.

7. The process as defined by claim 6, wherein said alkali metal hydroxide is sodium hydroxide.

8. The process as defined by claim 1, wherein said alkali metal hydroxide is potassium hydroxide.

9. The process as defined by claim 1, wherein said eluent comprises between about 0 to 60%, by volume of water, about 40 to 100% of a water soluble alcohol selected from the group consisting of methanol and ethanol, and at least 0.1 gram sodium hydroxide per liter of eluent.

10. The process as defined as claim 1, wherein said eluent comprises between about 0 to 254% by volume of water, about 75 to 100% of methanol and at least 1.0 gram of sodium hydroxide per liter of eluent.

11. The process as defined by claim 1, wherein said activated carbon has gold and/or silver values adsorbed thereon from a cyanidation pulp.

* * * * *

UNITED STATES PATENT AND TRADEMARK OFFICE
CERTIFICATE OF CORRECTION

PATENT NO. : 3,935,006
DATED : January 27, 1976
INVENTOR(S) : Dennis D. Fischer

It is certified that error appears in the above-identified patent and that said Letters Patent are hereby corrected as shown below:

Claim 10, line 2; "about 0 to 254%" should read --about 0 to 25%--.

Signed and Sealed this fourth Day of May 1976

[SEAL]

Attest:

RUTH C. MASON
Attesting Officer

C. MARSHALL DANN
Commissioner of Patents and Trademarks